(12) United States Patent
Demir et al.

(10) Patent No.: US 11,915,529 B2
(45) Date of Patent: Feb. 27, 2024

(54) PROCESSING UNIT FOR A VEHICLE

(71) Applicant: Bayerische Motoren Werke Aktiengesellschaft, Munich (DE)

(72) Inventors: Hakan Demir, Munich (DE); Christof Gebhart, Munich (DE); Frank Hergemoeller, Markt Schwaben (DE); Philipp Keller, Ettenbeuren (DE); Maximilian Krautwig, Munich (DE); Kerstin Landrock, Herrsching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 386 days.

(21) Appl. No.: 16/848,764

(22) Filed: Apr. 14, 2020

(65) Prior Publication Data
US 2020/0242857 A1 Jul. 30, 2020

Related U.S. Application Data

(63) Continuation of application No. PCT/EP2018/083157, filed on Nov. 30, 2018.

(30) Foreign Application Priority Data

Dec. 5, 2017 (DE) ...................... 10 2017 221 926.2

(51) Int. Cl.
*G07C 5/00* (2006.01)
*B60R 25/24* (2013.01)
(Continued)

(52) U.S. Cl.
CPC .............. *G07C 5/008* (2013.01); *B60R 25/24* (2013.01); *G05D 1/0088* (2013.01);
(Continued)

(58) Field of Classification Search
CPC .. G07C 5/008; G07C 5/0808; G07C 9/00309; B60R 25/24; G05D 1/0088;
(Continued)

(56) References Cited

U.S. PATENT DOCUMENTS 4,694,687 A * 9/1987 Bonin .................... G01P 15/125
73/116.01
2004/0138790 A1* 7/2004 Kapolka ................. G06Q 10/08
701/29.3

(Continued)

FOREIGN PATENT DOCUMENTS

DE 103 29 871 A1 1/2005
DE 10 2010 002 740 A1 9/2011
(Continued)

OTHER PUBLICATIONS

International Search Report (PCT/ISA/210) issued in PCT Application No. PCT/EP2018/083157 dated May 7, 2019 with English translation (eight (8) pages).

(Continued)

*Primary Examiner* — James J Lee
*Assistant Examiner* — Alexander George Matta
(74) *Attorney, Agent, or Firm* — Crowell & Moring LLP

(57) ABSTRACT

A processing unit includes a first communication interface that is designed for communication with a server device and/or a mobile device. The processing unit also has a second communication interface, which is designed for communication with the mobile device. The processing unit further has an internal communication interface of the processing unit, which is designed for communication with a vehicle bus network of the vehicle. The processing unit is designed to receive vehicle access data, which is representative of an access authorization of a driver to the vehicle via the second communication interface. The processing unit is (Continued)

also designed to determine depending on the vehicle access data a release signal for enabling a use of the vehicle and to provide it to the internal communication interface. The processing unit is also designed to receive vehicle analysis data via the internal communication interface.

14 Claims, 2 Drawing Sheets

(51) Int. Cl.
*G05D 1/00* (2006.01)
*H04W 4/80* (2018.01)
*G05D 1/02* (2020.01)
*G06Q 50/30* (2012.01)

(52) U.S. Cl.
CPC .......... *G05D 1/0276* (2013.01); *G06Q 50/30* (2013.01); *H04W 4/80* (2018.02)

(58) Field of Classification Search
CPC .. G05D 1/0276; G06Q 50/30; G06Q 10/0631; G06Q 10/20; H04W 4/80
See application file for complete search history.

(56) References Cited

U.S. PATENT DOCUMENTS

| | | |
|---|---|---|
| 2011/0291797 A1 | 12/2011 | Tessier et al. |
| 2014/0244110 A1* | 8/2014 | Tharaldson ........ G01C 21/3691 701/99 |
| 2015/0137943 A1 | 5/2015 | Nagel et al. |
| 2016/0003621 A1* | 1/2016 | Koenig ................. G06F 3/0485 701/31.4 |
| 2016/0063453 A1 | 3/2016 | Guenther et al. |
| 2016/0241699 A1* | 8/2016 | Milnark .................. H04W 4/44 |
| 2017/0039668 A1* | 2/2017 | Luke .................... G07C 5/0808 |
| 2017/0324817 A1* | 11/2017 | Oliveira .................. H04L 67/52 |
| 2019/0087752 A1 | 3/2019 | Kaufer et al. |
| 2019/0120195 A1* | 4/2019 | King ...................... H04W 4/02 |
| 2019/0141756 A1* | 5/2019 | Lei ........................ H04W 76/16 |
| 2019/0265966 A1* | 8/2019 | Shimomura ........... G06F 21/44 |
| 2019/0266190 A1* | 8/2019 | Naffati .................... H04L 67/34 |

FOREIGN PATENT DOCUMENTS

| | | |
|---|---|---|
| DE | 10 2010 042 432 A1 | 4/2012 |
| DE | 10 2012 012 389 A1 | 1/2013 |
| DE | 10 2013 208 169 A1 | 11/2014 |
| DE | 10 2015 016 928 A1 | 7/2016 |
| DE | 10 2015 213 449 A1 | 1/2017 |
| DE | 10 2016 104 530 A1 | 9/2017 |

OTHER PUBLICATIONS

German-language Written Opinion (PCT/ISA/237) issued in PCT Application No. PCT/EP2018/083157 dated May 7, 2019 (nine (9) pages).

German-language Search Report issued in German Application No. 10 2017 221 926.2 dated May 29, 2018 with partial English translation (15 pages).

* cited by examiner

PROCESSING UNIT FOR A VEHICLE

CROSS REFERENCE TO RELATED APPLICATIONS

This application is a continuation of PCT International Application No. PCT/EP2018/083157, filed Nov. 30, 2018, which claims priority under 35 U.S.C. § 119 from German Patent Application No. 10 2017 221 926.2, filed Dec. 5, 2017, the entire disclosures of which are herein expressly incorporated by reference.

BACKGROUND AND SUMMARY OF THE INVENTION

The disclosed subject matter relates to a processing unit for a vehicle, a mobile apparatus and a system.

Vehicle testing is very important as part of the development of new vehicles. The vehicle testing involves software vehicle functions or components being tested, for example. If need be, a vehicle diagnosis is performed on the basis of vehicle analysis data, which allows findings to be assigned to faults on vehicle components. Vehicle diagnosis is used for example during vehicle development, during quality assurance for statistical evaluations or during fault analysis in the event of repair.

The object on which the disclosed subject matter is based is that of providing a processing unit for a vehicle, a mobile apparatus, and a system that allow vehicle testing and/or vehicle diagnosis to be performed efficiently.

The disclosed subject matter is distinguished according to a first aspect by a processing unit for a vehicle. The processing unit has a first communication interface of the processing unit designed to communicate with a server apparatus and/or a mobile apparatus. The processing unit also has second communication interface of the processing unit designed to communicate with a mobile apparatus. The processing unit moreover has an internal communication interface of the processing unit designed to communicate with a vehicle bus network of the vehicle. The processing unit is designed to use the second communication interface of the processing unit to receive vehicle entry data representative of an access authorization for a driver to access the vehicle. The processing unit is also designed to take the vehicle entry data as a basis for ascertaining an enable signal to allow use of the vehicle and for providing said enable signal on the internal communication interface of the processing unit.

The processing unit is further designed to use the internal communication interface at the processing unit to receive vehicle analysis data. The processing unit is moreover designed to take the received vehicle analysis data as a basis for ascertaining provision data and for providing said provision data on the first communication interface of the processing unit for the purpose of communication with the server apparatus and/or the mobile apparatus.

The processing unit is disposed in the vehicle, for example. The first communication interface of the processing unit and the second communication interface of the processing unit are in the form of communication interfaces for wireless data transfer, for example, e.g. Bluetooth, WLAN, NFC, 3G/4G/5G.

The vehicle entry data are encrypted and signed elements, for example, that allow the driver keyless access to the vehicle. The enable signal allows the vehicle to be unlocked or locked and/or the engine of the vehicle to be started, for example.

The vehicle analysis data are for example vehicle function data and/or sensor data and/or data pertaining to a current software version in the vehicle and/or data pertaining to a current hardware version in the vehicle. Vehicle function data can comprise sensor data or any conditioned data.

Transfer of the provision data to the server apparatus and/or the mobile apparatus as a result of the provision on the first communication interface allows, for example, a developer to access the provision data during a trip. The developer is, for example, the driver of the vehicle or a respective developer who has access to the server apparatus. In this way, it is, for example, also possible for the developer to query a vehicle state, e.g. a current software version of the vehicle, without needing to be in the vehicle. Furthermore, it can make for very efficient use of the vehicle by different developers as a result of a simple and fast provision and opening-up of the vehicle.

In accordance with one optional refinement, the processing unit is designed to use the first communication interface of the processing unit to receive a prescribed handling stipulation and to ascertain the provision data on the basis of the handling stipulation.

The handling stipulation may be one prescribed by the developer, for example. The handling stipulation is a calculation rule, for example. The calculation rule can, for example, prescribe how prescribed sensor data should be combined or what mathematical operations should be applied to said sensor data. The handling stipulation can also comprise a parameter. In accordance with a further optional refinement, the processing unit is designed to use the first communication interface of the processing unit to receive a prescribed transfer stipulation and to ascertain the provision data on the basis of the transfer stipulation.

The transfer stipulation may be prescribed by the developer, for example. It can therefore represent a filter and thus help to selectively assign the vehicle analysis data to the provision data. In this way, it is a simple matter to limit, or keep down, a volume of data in the provision data in a suitable manner.

In accordance with a further optional refinement, the processing unit for a vehicle is designed to use the first communication interface of the processing unit to receive data containers, which are representative of program data for updating vehicle functions, from the server apparatus and to provide said data containers on the internal communication interface.

The data containers are, for example, representative of a new software version and comprise applicable program code. As such, vehicle functions can be updated during the trip, for example, and the updated vehicle functions can be examined during the trip.

In accordance with a further optional refinement, the processing unit for a vehicle is designed to take the vehicle entry data as a basis for ascertaining vehicle user data and for providing said vehicle user data on the first communication interface of the processing unit. The vehicle user data are representative of an identity of the driver. This provides assistance for efficient fleet management.

Physically, the first and second communication interfaces of the processing unit can form one unit and thus, be a single communication interface.

In accordance with a second aspect, the disclosed subject matter is distinguished by a mobile apparatus. The mobile apparatus is free from static arrangement in the vehicle. It is a mobile terminal, e.g. a smartphone and/or a tablet PC.

The mobile apparatus has a first communication interface of the mobile apparatus, designed to communicate with the server apparatus. It further has a second communication interface of the mobile apparatus and a third communication interface of the mobile apparatus, designed to communicate with the processing unit.

The mobile apparatus is designed to use the first communication interface of the mobile apparatus to receive vehicle entry data from the server apparatus and to provide said vehicle entry data on the second communication interface of the mobile apparatus for the purpose of transfer to the processing unit. The mobile apparatus is moreover designed to use the third communication interface of the mobile apparatus to receive the provision data and to signal them. This can be effected visually and/or audibly, for example.

The developer can use an application installed on the mobile apparatus to book the vehicle, for example. The vehicle entry data received from the mobile apparatus allows, for example, keyless access by the developer to the vehicle. The transfer of the vehicle entry data from the mobile apparatus to the processing unit takes place automatically or at the instigation of the driver, for example.

The first and/or second and/or third communication interface of the mobile apparatus are in the form of communication interfaces for wireless data transfer, for example, e.g. Bluetooth, WLAN, NFC, 3G/4G/5G.

Physically, the first and/or second and/or third communication interface of the mobile apparatus can form one unit and can thus be a single communication interface.

The disclosed subject matter is distinguished according to a third aspect by a system. The system comprises the mobile apparatus according to the first aspect, the vehicle, which comprises the processing unit according to the first aspect, and a server apparatus, which is designed to provide vehicle entry data for the purpose of transfer to the mobile apparatus and to receive provision data from the processing unit.

The developer can use the mobile apparatus to book the vehicle using already available backend-based reservation systems of the server apparatus, for example. Following confirmation of the booking, the vehicle entry data are transferred from the server apparatus to the mobile apparatus.

In accordance with one optional refinement, the server apparatus of the system is designed to provide data containers for the purpose of transfer to the processing unit.

The data containers are, for example, used for updating the vehicle controllers, and the vehicle functions thereof. The provision data are taken as a basis for ascertaining data containers for the purpose of rectifying vehicle malfunctions, for example.

In accordance with a further optional refinement, the server apparatus of the system is designed to provide the handling stipulation for the purpose of transfer to the processing unit.

In accordance with a further optional refinement, the server apparatus of the system is designed to provide the transfer stipulation for the purpose of transfer to the processing unit.

In accordance with a further optional refinement, the server apparatus of the system is designed to receive vehicle user data from the processing unit.

Exemplary embodiments of the disclosed subject matter are explained in more detail below on the basis of the schematic drawings, in which:

Other objects, advantages and novel features of the present subject matter will become apparent from the following detailed description of one or more preferred embodiments when considered in conjunction with the accompanying drawings.

Elements having the same design or function are denoted by the same reference signs across the figures.

DETAILED DESCRIPTION OF THE DRAWINGS

Figure 1:
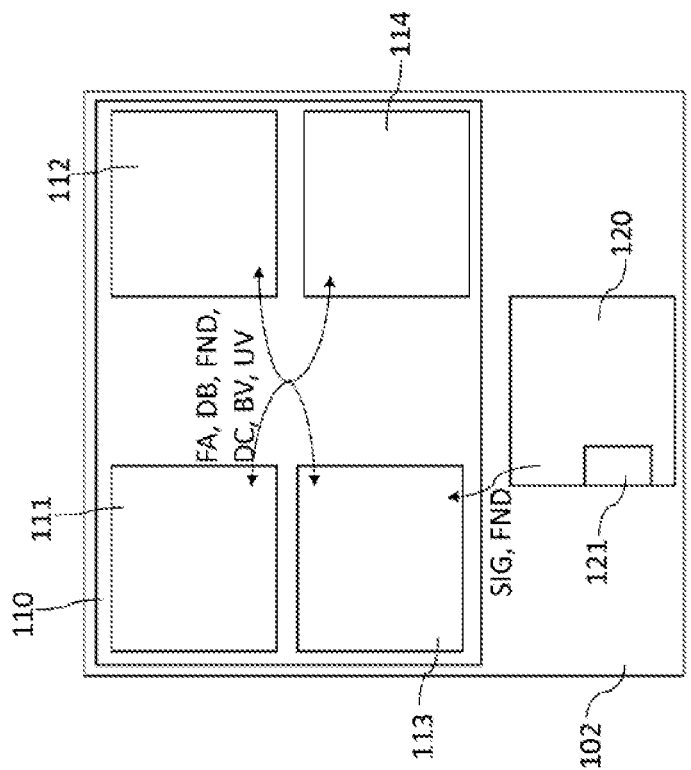
FIG. 1 shows a processing unit for a vehicle.

FIG. 1 shows a processing unit 102 for a vehicle 101.

The processing unit 102 is disposed in the vehicle 101, for example. The processing unit 102 comprises, for example, a data analysis and data transfer module 110, which can also be referred to as an MDR module or mobile data recorder module, and a vehicle entry module 120, which can also be referred to as an access module. The data analysis and data transfer module 110 comprise, for example, a first communication interface 111 of the processing unit 102, a data handling module 112, an internal communication interface 113 of the processing unit 102 and a memory module 114.

The vehicle entry module 120 has a second communication interface 121 of the processing unit 102. The vehicle entry module 120 can use the second communication interface 121 of the processing unit 102 to receive the vehicle entry data. The vehicle entry data are taken as a basis for ascertaining an enable signal, which is transferred via the internal communication interface 113 of the processing unit 102 to a vehicle bus network. The enable signal allows a developer keyless and time-saving access to the vehicle as a driver. This allows efficient fleet management from the point of view of time, for example.

The vehicle entry data are also taken as a basis for ascertaining vehicle user data representative of an identity of the driver. The vehicle user data are transferred via the internal communication interface of the processing unit to the data analysis and data transfer module.

The internal communication interface of the processing unit is used to transfer vehicle analysis data to the data analysis and data transfer module. The vehicle analysis data are data representative of vehicle functions, for example.

In the data handling module, the vehicle analysis data are taken as a basis for ascertaining provision data. The provision data are handled on the basis of a provided processing stipulation, for example. By way of example, sensor data, e.g. acceleration data, can be taken as a basis for ascertaining elasticity data. The processing stipulation can be taken as a basis for ascertaining, for example, elasticity data for an acceleration of between 40 km/h and 80 km/h as provision data.

A transfer stipulation can be taken as a basis for selectively providing the provision data for the purpose of transfer to the first communication interface 111 of the processing unit 102. By way of example, more provision data can be transferred at the beginning of development of the vehicle than shortly before start of production.

The data containers received via the second communication interface 121 are transferred via the internal communication interface 113 to the vehicle bus network for an update and/or fault rectification for vehicle controllers. This allows efficient vehicle diagnosis during the trip.

Figure 2:
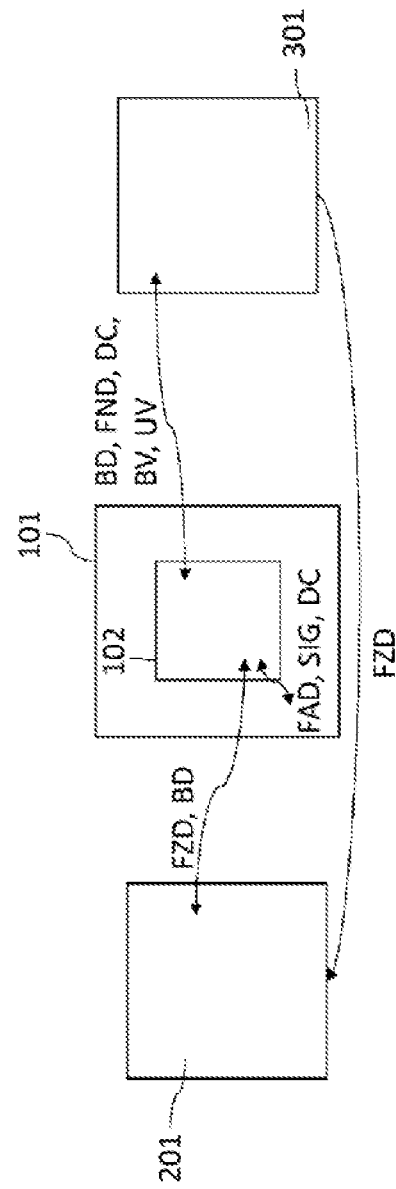
FIG. 2 shows a system for data transfer and data analysis for a vehicle.

FIG. 2 shows a system for data transfer and data analysis for a vehicle. The system comprises the mobile apparatus 201, the vehicle, comprising the processing unit, and a server apparatus 301.

The processing unit 102 can transfer the provision data to the server apparatus 301 and/or to the mobile apparatus 201, for example. It is therefore possible for the developer to use the provision data for the vehicle diagnosis during the trip. The processing unit 102 can also receive a handling stipulation and a transfer stipulation from the server apparatus 301.

LIST OF REFERENCE SIGNS

101 Vehicle
102 Processing unit
110 Data analysis and data transfer module
120 Vehicle entry module
111 First communication interface of the processing unit
121 Second communication interface of the processing unit
112 Data handling module
113 Internal communication interface of the processing unit
201 Mobile apparatus
301 Server apparatus
114 Memory module
FAD Vehicle analysis data
BD Provision data
FZD Vehicle entry data
SIG Enable signal
FND Vehicle user data
BV Handling stipulation
UV Transfer stipulation
DC Data container The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A processing unit for a vehicle, comprising:
a first communication interface circuit configured to communicate with a server apparatus and/or a mobile apparatus;
a second communication interface circuit configured to communicate with a mobile apparatus;
an internal communication interface circuit configured to communicate with a vehicle bus network of the vehicle, wherein
the processing unit is configured to:
receive vehicle entry data representative of an access authorization for a driver to access the vehicle via the second communication interface circuit;
generate an enable signal based on the vehicle entry data to allow use of the vehicle and for providing the enable signal on the internal communication interface circuit;
receive vehicle analysis data via the internal communication interface circuit; and
generate provision data by applying a mathematical operation defined by a prescribed handling stipulation to the vehicle analysis data;
transfer the provision data via the first communication interface circuit to the server apparatus and/or the mobile apparatus; and
handle the provision data based on a processing stipulation to ascertain elasticity data for an acceleration of the vehicle.

2. The processing unit according to claim 1, wherein
the vehicle analysis data comprises vehicle sensor data, and
the processing unit is further configured to:
receive, via the first communication interface circuit from the server apparatus, the prescribed handling stipulation that defines the mathematical operation; and
ascertain the provision data based on the handling stipulation.

3. The processing unit according to claim 1, further configured to:
receive, via the first communication interface circuit from the server apparatus, a prescribed transfer stipulation that defines filtering of the provision data to reduce volume of the provision data; and
ascertain the provision data based on the transfer stipulation.

4. The processing unit according to claim 2, further configured to:
receive, via the first communication interface circuit from the server apparatus, a prescribed transfer stipulation that defines filtering of the provision data to reduce volume of the provision data; and
ascertain the provision data based on the transfer stipulation.

5. The processing unit according to claim 1, further configured to:
receive, via the first communication interface circuit from the server apparatus, data containers ascertained based on the provision data, wherein
the data containers are representative of program data for updating vehicle functions; and
provide the data containers on the internal communication interface circuit.

6. The processing unit according to claim 1, further configured to:
generate vehicle user data based on the vehicle entry data; and
transfer the vehicle user data via the first communication interface circuit, wherein
the vehicle user data are representative of an identity of the driver.

7. A system comprising:
a server apparatus configured to transfer vehicle entry data representative of an access authorization for a driver to access a vehicle to a mobile apparatus and to receive provision data from a processing unit of the vehicle, wherein
the vehicle comprises:
the processing unit;
a first communication interface circuit configured to communicate with the server apparatus and/or the mobile apparatus;
a second communication interface circuit configured to communicate with the mobile apparatus; and
an internal communication interface circuit configured to communicate with a vehicle bus network of the vehicle, wherein
the processing unit is configured to:
use the second communication interface circuit to receive the vehicle entry data;
generate an enable signal based on the vehicle entry data to allow use of the vehicle and for providing the enable signal on the internal communication interface circuit;

use the internal communication interface circuit to receive vehicle analysis data;

generate the provision data by applying a mathematical operation defined by a prescribed handling stipulation to the vehicle analysis data;

transfer the provision data via the first communication interface circuit to the server apparatus and/or the mobile apparatus; and handle the provision data based on a processing stipulation to ascertain elasticity data for an acceleration of the vehicle;

the mobile apparatus comprises:

a third communication interface circuit configured to receive the vehicle entry data from the server apparatus;

a fourth communication interface circuit configured to transfer the vehicle entry data to the processing unit to allow keyless access to the vehicle; and a fifth communication interface circuit configured to receive the provision data from the processing unit, wherein the mobile apparatus is configured to:

signal the provision data audibly or visually.

8. The system according to claim 7, wherein the server apparatus is further configured to:
transfer data containers ascertained based on the provision data to the processing unit.

9. The system according to claim 7, wherein the server apparatus is further configured to:
transfer the handling stipulation to the processing unit.

10. The system according to claim 7, in which the server apparatus is further configured to:
transfer a transfer stipulation to the processing unit, wherein the transfer stipulation defines filtering of the provision data to reduce volume of the provision data.

11. The system according to claim 7, wherein the server apparatus is further configured to:
receive vehicle user data from the processing unit.

12. The system according to claim 8, wherein the server apparatus is further configured to:
transfer the handling stipulation to the processing unit.

13. The system according to claim 8, wherein the server apparatus is further configured to:
transfer a transfer stipulation to the processing unit, wherein the transfer stipulation defines filtering of the provision data to reduce volume of the provision data.

14. The system according to claim 9, wherein the server apparatus is further configured to:
transfer a transfer stipulation to the processing unit, wherein the transfer stipulation defines filtering of the provision data to reduce volume of the provision data.

* * * * *